J. DU BOIS.

Revolving Flood Gate.

No. 45,913.

Patented Jan. 17, 1865.

WITNESSES

INVENTOR
John Du Bois
By his Atty
Mason, Fenwick & Lawrence

UNITED STATES PATENT OFFICE.

JOHN DUBOIS, OF WILLIAMSPORT, PENNSYLVANIA.

IMPROVEMENT IN REVOLVING FLOOD-GATES.

Specification forming part of Letters Patent No. 45,913, dated January 17, 1865.

*To all whom it may concern:*

Be it known that I, JOHN DUBOIS, of Williamsport, county of Lycoming, State of Pennsylvania, have invented a new and useful Revolving Flood-Gate; and I do hereby declare that the following is a full, clear, and exact description thereof, reference being had to the accompanying drawings, making a part of this specification, in which—

Figure 1:
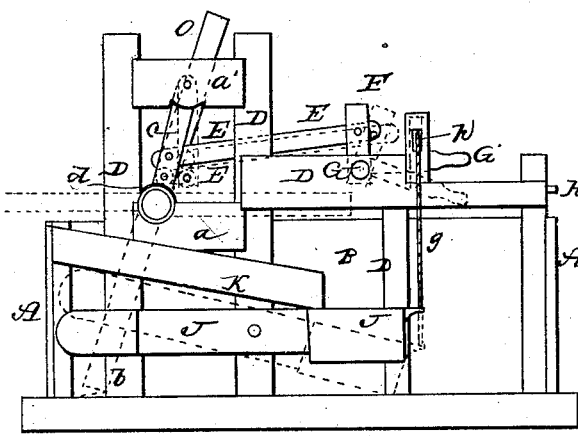
Figure 2:
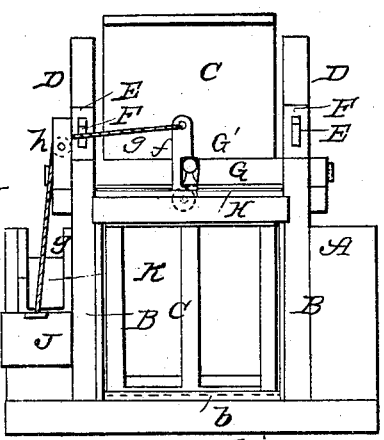
Figure 3:
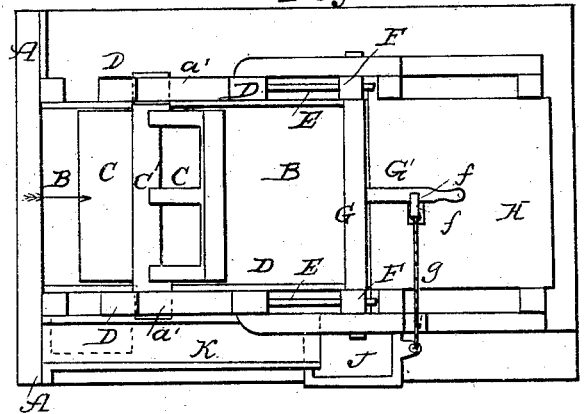
Figure 4:
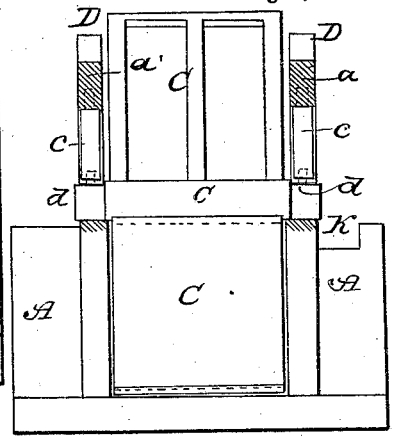

Figure 1 is an elevation of one side of my revolving flood-gate. Fig. 2 is a rear end elevation of Fig. 1. Fig. 3 is a top view of the same. Fig. 4 is a front view.

Similar letters of reference indicate corresponding parts in the several figures.

This invention relates to a novel mode of constructing and operating flood-gates, which constitute a part of the dam when closed, and which are used for making what are known as "artificial" or "splash" floods when the streams are naturally too low to be navigated without accumulating a large body of water and letting it off in a sufficient quantity at pleasure, for the purpose of floating logs, rafts, boats, &c.

To enable others skilled in the art to make and use my invention, I will describe its construction and operation.

In the accompanying drawings, A represents a portion of a dam, and B the chute through which the water that is dammed up can be allowed to escape at pleasure. On each side of the chute B a frame-work is erected, which is made of very strong timbers, securely braced and strengthened against any strain which might be brought against the gate C. This gate C has two wings, which are secured to a horizontal transverse shaft, C', that has its end bearings upon the two horizontal timbers $a\ a$ of the frame D, as shown in Figs. 1 and 3. Each one of the wings of the gate C is of sufficient size to close up the passage through the chute or trough B when the gate is arranged at an angle of about thirty degrees, as shown in Fig. 1, in which position the lower edge of the gate abuts against an inclined plane, $b$, which is secured to the bottom of the flume-trough, and in this position the gate is confined by the following contrivance: The ends of the shaft C' are seated in half-circular bearings, and are held down therein by means of arms $c\ c$, which are pivoted at their upper ends to the horizontal cross-beams $a'\ a'$ of the frame D. The lower ends of these arms $c\ c$ carry friction-wheels $d\ d$, which bear upon the ends of shaft C' when the lower ends of their arms are moved forward, and thus prevent the gate from rising over the abutment $b$. The arms $c\ c$, which are thus made to hold the shaft of the gate down in its bearings and prevent the gate from turning, have rods E E pivoted to them, which extend back in a longitudinal direction, and are again pivoted to arms F F on the ends of a horizontal rock-shaft, G, as shown in Figs. 1 and 3. This rock-shaft G has its bearings in the frame D above a platform, H, which is arranged over the chute-box B, and projecting from the rear side of said shaft is an arm, G'. By elevating this latter arm the two holding-down arms $c\ c$ will be brought over the ends of the gate-shaft C', and by depressing said arm the two arms $c\ c$ will be removed from the shaft C' and allow the latter to rise and the gate to turn. The notched catch $f$, which is pivoted to the platform H, is intended for holding the arm G' in place when it is not desired that the gate should turn.

It will be seen from the above description that as both of the arms $c\ c$ are connected to the rock-shaft G they will be moved simultaneously, and also that when their lower ends are moved back so as to relieve the shaft C' this shaft, together with the wings of the gate, will rise bodily over the inclined abutment $b$, when an undue pressure is brought to act upon it, such as the pressure of the water in the basin; then, after the lower end of the gate has passed over the abutment $b$, the gate will rotate and fall back into its bearings, when the arms $c\ c$ can be moved back to their places.

When it is desired to check the flow of water through the chute, the wing of the gate opposite that one which last closed the chute is now moved down until it enters the water, when the current will carry it down to its place, as above described.

In practice, the abutment $b$, for stopping the gate when it is held down in its bearings by the arms $c\ c$, will be inclined toward the basin, so that when the pressure on the shaft of the gate is removed the latter will gradually move over this abutment and allow the water to escape. By having two wings to the gate, the shaft C' forming the fulcrum, the gate can be equally balanced on said fulcrum, and thus made comparatively easy to turn and bring into position again for stopping the flow of water through the chute.

The points of inpingement of the rollers $d\ d$ upon the ends of the gate-shaft C are a little on one side of a vertical line drawn through the axis of said shaft, and hence it will be seen that it will be necessary to use the catch $f$ for holding the arm $G'$, and thus preventing the arms $c\ c$ from casually springing back and allowing the gate to open.

As the gate will be forced open when the arm $G'$ is released, I have contrived an arrangement by means of which the water in the basin or pond, rising above a certain level, will automatically open the gate and escape. In order to carry out this feature, I attach a rope or chain, $g$, to the upper end of the catch-piece $f$, and carry the former over a pulley, $h$, which is pivoted in a post projecting up from the frame D, as shown in Figs. 1 and 2, and on the lower end of this rope or chain a bucket or box, J, is suspended. This box is adapted for containing a certain quantity of water, which shall be of sufficient weight to release the catch from the arm $G'$. This box is secured on one end of a loaded lever, $J'$, and arranged at the lower end of an inclined spout or trough, K, as shown in Fig. 1, the upper end of which trough is nearly on a level with the top of the dam A. By this arrangement it will be seen that before the water in the basin can overflow the dam A it will escape through the trough K and fill the box J. The weight of the water in this box will remove the catch $f$ from the arm $G'$, and allow the pressure of water against the gate to thrust back the arms $c\ c$ and open the gate.

The upper end of the trough K may be located at any desired point below the top of the dam, so that the gate can be opened when the water attains any desired level in the basin.

Having thus described my invention, what I claim as new, and desire to secure by Letters Patent, is—

1. A centrally-balanced revolving flood-gate constructed and operating substantially as herein described.

2. Supporting the gate C in its bearings in such manner that it shall be allowed to rise bodily in the act of opening to allow the water to escape, and using the arms $c\ c$ or equivalent means for holding the gate down and preventing it from turning, substantially as described.

3. The abutment $b$ on the floor of the chute, when used in conjunction with a revolving flood-gate, operating substantially as described.

4. A revolving flood-gate which is so arranged and constructed that it will be opened by the water in the basin rising above a certain determined level, substantially as described.

JOHN DUBOIS.

Witnesses:
S. V. VAN FLEET,
JOSEPH DUBOIS.